(12) United States Patent
Town et al.

(10) Patent No.: US 9,108,585 B2
(45) Date of Patent: *Aug. 18, 2015

(54) IGNITION LOCK STEERING COLUMN LOCK ASSEMBLY

(71) Applicant: STRATTEC Security Corporation, Milwaukee, WI (US)

(72) Inventors: Scott M. Town, Milwaukee, WI (US); Paul C. Waller, Cedarburg, WI (US); Gregory J. Organek, Whitefish Bay, WI (US); Alan Ritz, Brookfield, WI (US)

(73) Assignee: STRATTEC SECURITY CORPORATION, Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/579,455

(22) Filed: Dec. 22, 2014

(65) Prior Publication Data

US 2015/0107315 A1   Apr. 23, 2015

Related U.S. Application Data

(63) Continuation of application No. 14/095,405, filed on Dec. 3, 2013, now Pat. No. 8,943,863.

(60) Provisional application No. 61/732,587, filed on Dec. 3, 2012.

(51) Int. Cl.
*B60R 25/02* (2013.01)
*B60R 25/021* (2013.01)
(Continued)

(52) U.S. Cl.
CPC ......... *B60R 25/02115* (2013.01); *B60R 25/021* (2013.01); *B60R 25/0215* (2013.01); *E05B 27/0003* (2013.01); *Y10T 70/565* (2015.04); *Y10T 70/5664* (2015.04); *Y10T 70/5956* (2015.04)

(58) Field of Classification Search
CPC   B60R 25/02; B60R 25/021; B60R 25/02113; B60R 25/02115; B60R 25/02153; B60R 25/0215; B60R 25/02142; B60R 25/0211; B60R 25/02121; B60R 25/02126; B60R 25/02128; Y10T 70/565; Y10T 70/5655; Y10T 70/5659; Y10T 70/5664; Y10T 70/5956
USPC ...... 74/527; 70/182–186, 252, 379 R, 379 A, 70/380, DIG. 30
See application file for complete search history.

(56) References Cited

U.S. PATENT DOCUMENTS

| 1,657,402 | A | * | 1/1928 | Kenworthy et al. | 70/252 |
| 2,101,446 | A | * | 12/1937 | Neiman | 70/186 |
| 3,426,560 | A | * | 2/1969 | Dwan | 70/252 |

(Continued)

*Primary Examiner* — Lloyd Gall
(74) *Attorney, Agent, or Firm* — Michael Best & Friedrich LLP (57) ABSTRACT

An ignition lock steering column lock includes a locking unit including a lockbolt selectively engageable with a steering member to prevent its rotation. A driver is operable to rotate about an axis in response to rotation of a key cylinder via a matched key. A solenoid assembly selectively prevents rotation of the driver. An armature of the solenoid assembly is movable toward a core when electric current is conducted through a coiled wire. The armature has a shape generally defining a plane and includes an axial end face configured to selectively interfere with an abutment of the driver such that force on the armature from the abutment in response to attempted rotation of the driver is directed generally along the plane.

12 Claims, 13 Drawing Sheets

(51) Int. Cl.
   *B60R 25/0215* (2013.01)
   *E05B 27/00* (2006.01)

(56) References Cited

U.S. PATENT DOCUMENTS

| | | | | |
|---|---|---|---|---|
| 3,569,930 A * | 3/1971 | Hirama | | 340/457 |
| 3,575,023 A * | 4/1971 | Shimizu | | 70/252 |
| 3,590,611 A * | 7/1971 | Nakashima | | 70/186 |
| 3,600,915 A * | 8/1971 | Corboud | | 70/72 |
| 3,650,131 A * | 3/1972 | Eichenauer | | 70/252 |
| 3,724,244 A * | 4/1973 | Schaumburg | | 70/360 |
| 3,877,265 A * | 4/1975 | Schaumberg | | 70/252 |
| 3,902,341 A * | 9/1975 | Peitsmeier | | 70/252 |
| 4,038,508 A * | 7/1977 | Mapelsden | | 200/329 |
| 4,052,869 A * | 10/1977 | Weber | | 70/252 |
| 4,414,830 A * | 11/1983 | Maiocco | | 70/252 |
| 4,603,564 A * | 8/1986 | Kleinhany et al. | | 70/277 |
| 4,938,043 A * | 7/1990 | Burr | | 70/252 |
| 4,947,968 A * | 8/1990 | Slavin et al. | | 74/483 R |
| 4,972,692 A * | 11/1990 | Morikawa et al. | | 70/186 |
| 5,255,547 A * | 10/1993 | Burr et al. | | 70/252 |
| 5,634,358 A * | 6/1997 | Myers | | 70/233 |
| 5,656,867 A * | 8/1997 | Kokubu | | 307/10.5 |
| 5,685,183 A * | 11/1997 | Hattori et al. | | 70/252 |
| 5,794,469 A * | 8/1998 | Suzuki | | 70/252 |
| 5,816,083 A * | 10/1998 | Bianco | | 70/278.3 |
| 5,988,008 A * | 11/1999 | Rau | | 74/473.1 |
| 6,237,378 B1 * | 5/2001 | Canard | | 70/252 |
| 6,327,882 B1 * | 12/2001 | Canard | | 70/186 |
| 6,487,883 B2 * | 12/2002 | Suzuki et al. | | 70/247 |
| 6,571,587 B2 * | 6/2003 | Dimig et al. | | 70/186 |
| 6,751,991 B2 * | 6/2004 | Tamukai | | 70/186 |
| 6,786,069 B2 * | 9/2004 | Ochi | | 70/252 |
| 6,796,153 B2 * | 9/2004 | Ochi | | 70/186 |
| 6,810,700 B2 * | 11/2004 | Okuno | | 70/186 |
| 6,810,701 B2 * | 11/2004 | Lee et al. | | 70/186 |
| 6,826,934 B2 * | 12/2004 | Canard | | 70/186 |
| 6,941,779 B2 * | 9/2005 | Shigeyama et al. | | 70/186 |
| 7,069,754 B2 * | 7/2006 | Imai | | 70/186 |
| 7,111,480 B2 * | 9/2006 | Dimig et al. | | 70/186 |
| 7,435,919 B2 * | 10/2008 | Hidaka | | 200/43.08 |
| 7,475,576 B2 * | 1/2009 | Fernandez | | 70/186 |
| 7,536,886 B2 * | 5/2009 | Fernandez | | 70/186 |
| 7,669,444 B2 * | 3/2010 | Fernandez et al. | | 70/185 |
| 8,141,397 B2 * | 3/2012 | Nakamoto | | 70/186 |
| 8,234,895 B2 * | 8/2012 | Nakamoto et al. | | 70/252 |
| 8,408,031 B2 * | 4/2013 | Hirashita | | 70/237 |
| 8,429,942 B2 * | 4/2013 | Kakizaki | | 70/237 |
| 8,943,863 B2 * | 2/2015 | Town et al. | | 70/186 |
| 2003/0079509 A1* | 5/2003 | Ochi | | 70/186 |
| 2003/0115917 A1* | 6/2003 | Rudolph et al. | | 70/252 |
| 2003/0233857 A1* | 12/2003 | Chung | | 70/186 |
| 2004/0003632 A1* | 1/2004 | Ohtaki et al. | | 70/252 |
| 2004/0099024 A1* | 5/2004 | Ochi | | 70/186 |
| 2004/0149073 A1* | 8/2004 | Ruegenberg | | 74/527 |
| 2010/0192645 A1* | 8/2010 | Nakamoto | | 70/183 |
| 2010/0192649 A1* | 8/2010 | Nakamoto | | 70/353 |
| 2011/0100075 A1* | 5/2011 | Cho et al. | | 70/183 |
| 2011/0296881 A1* | 12/2011 | Tamezane et al. | | 70/252 |
| 2012/0186311 A1* | 7/2012 | Maltaverne et al. | | 70/187 |

* cited by examiner

IGNITION LOCK STEERING COLUMN LOCK ASSEMBLY

CROSS-REFERENCE TO RELATED APPLICATIONS

This application is a continuation of U.S. patent application Ser. No. 14/095,405, filed Dec. 3, 2013, now U.S. Pat. No. 8,943,863, which claims priority to U.S. Provisional Patent Application No. 61/732,587, filed Dec. 3, 2012, the entire contents of both of which are incorporated by reference herein.

BACKGROUND

The present invention relates to a vehicle ignition lock steering column lock.

SUMMARY

A lock device is provided for a vehicle having a steering member for controlling the direction of travel of the vehicle and an ignition switch. A locking unit includes a lockbolt selectively engageable with the steering member to prevent its rotation. A carrier is movable with the lockbolt, and a carrier pin is supported by the carrier and is movable from an extended position to a retracted position against a biasing member. A driver is operable to rotate about an axis in response to rotation of a key cylinder via a matched key. A post is coupled to the driver for rotation therewith, the post being axially slidable relative to the driver in response to movement of the key within the key cylinder. The post has a first configuration holding the carrier pin in the retracted position against a force of the biasing member while allowing unobstructed movement of the carrier and the lockbolt relative to the steering member. The post has a second configuration overlapping the extended carrier pin in a radial direction perpendicular to the axis, thereby obstructing the lockbolt from engaging with the steering member. The post has a third configuration which does not overlap the extended carrier pin. The carrier pin is positioned on a side of the driver that is proximate the steering member. The driver is formed with detents engageable with a resilient member to positively define three separate operational positions of the lock device.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
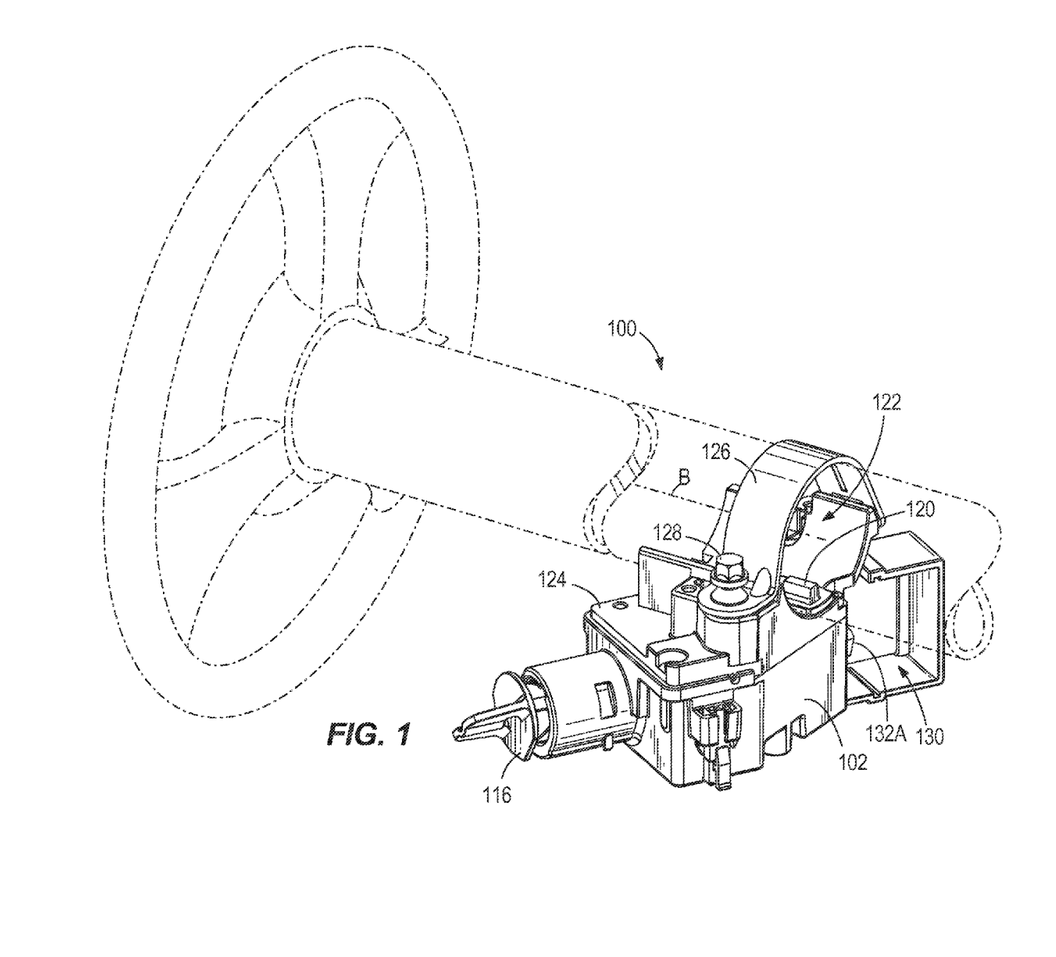
FIG. 1 is a perspective view of an ignition lock steering column lock assembly.
Figure 2:
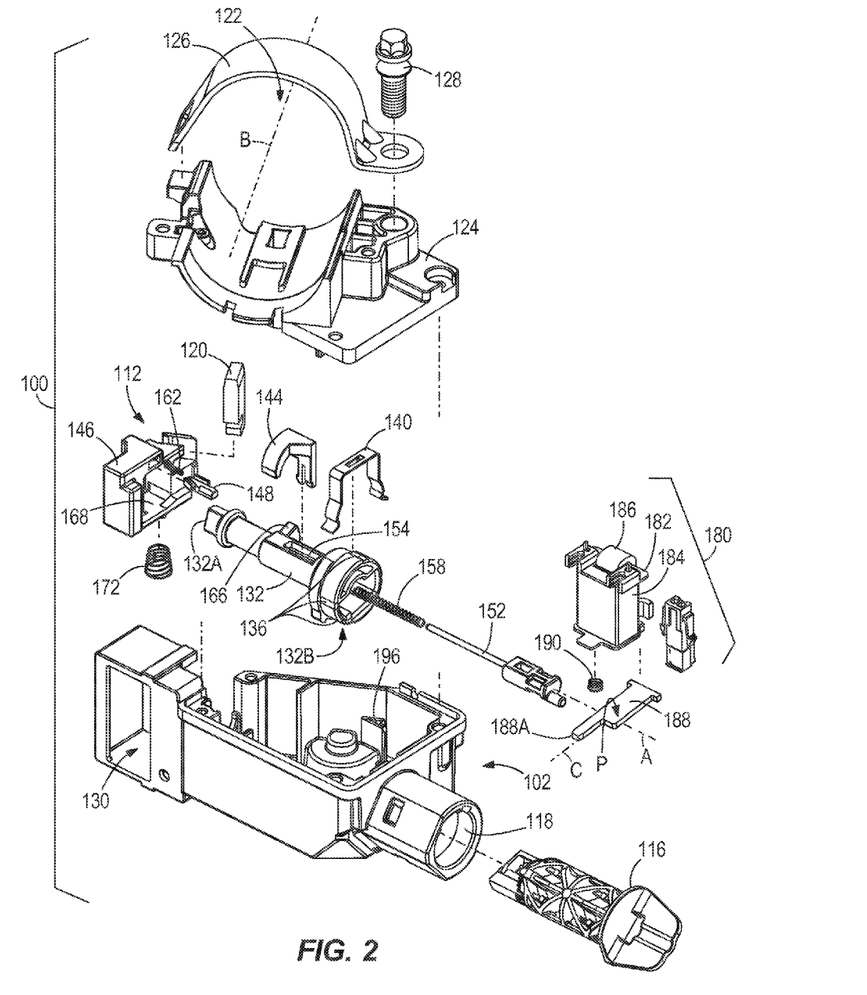
FIG. 2 is an exploded assembly view of the ignition lock steering column lock assembly of FIG. 1.

An ignition lock steering column lock assembly 100 is shown assembled in FIG. 1 and in an exploded assembly view in FIG. 2. A housing 102 encloses the operative parts of the ignition lock steering column lock assembly 100 and is mounted at a position within a vehicle to engage with a steering column coupled to a steering wheel or other steering device required to operate the vehicle. The ignition lock steering column lock assembly 100 is configured to receive a key 104 in a key cylinder 108 thereof, and the operation of the key 104 controls both the operative state of an ignition switch (not shown) and the operative state of a steering column lock subassembly 112. Although the key 104 and the key cylinder 108 are shown in later drawings, the ignition lock steering column lock assembly 100 is shown in FIGS. 1 and 2 in a near-final assembly stage, ready for shipping to a final assembly location, in which a disposable plug 116 is inserted into an aperture 118 of the housing 102 that normally receives the key cylinder 108. The steering column lock subassembly 112 includes a lockbolt 120 that is movable between a steering column locking position and a steering column unlocking position as described in further detail below. The steering column is received in an aperture 122 of the ignition lock steering column lock assembly 100 defined by a cover 124 and a strap or clamp 126 secured to the cover 124 with at least one fastener 128. The cover 124 and the clamp 126 define a steering column axis B (FIGS. 1 and 2).

The aperture 118 for receiving the key cylinder 108 is provided at a first end of the housing 102, and an aperture 130 for the ignition switch is provided at a second end, opposite the first end. The ignition switch is operated by a first end 132A of a driver 132, which rotates in response to rotation of the key cylinder 108. A second end 132B of the driver 132, opposite the first end 132A includes an outer surface with a plurality of notches 136. The notches 136 cooperate with a resilient member 140 to provide a detent mechanism, which holds the driver 132, and thus the key cylinder 108, in one of a plurality of predetermined orientations corresponding to operative positions or states of the ignition switch and the ignition lock steering column lock assembly 100, such as "OFF" (or key-out position), "ACC" (or accessory only position), and "RUN" (or "on" position), the corresponding operation of which is described in further detail below. It should be noted that the resilient member 140 is provided with two spring arms, each having a protrusion configured to engage a group of the notches 136 separate from that of the other spring arm of the resilient member 140. In this way, redundancy is achieved. Also, by providing the resilient member 140 engageable with the notches 136 in the driver 132, all detent positions are controlled by a single interface, and reliance on the ignition switch or the key cylinder 108 for providing detented OFF, ACC, and RUN positions is eliminated.

The steering column lock subassembly 112 includes the lockbolt 120 mentioned above, in addition to a post 144, a carrier 146, and a carrier pin 148. The post 144 is coupled to the driver 132 to rotate with the driver 132 about an axis A (i.e., the central axis of the driver 132 and also the key cylinder 108). The post 144 is coupled to a plunger 152 positioned inside the driver 132, and the post 144 extends through a slot 154 in the driver 132 so that the post 144 and the plunger 152 are axially slidable relative to the driver 132 (e.g., in response to insertion/retraction of the key 104). A plunger spring 158 biases the plunger 152 and the post 144 toward the second end 132B of the driver 132. Insertion of the key 104 into the key cylinder 108 moves the plunger 152 and the post 144 against the bias of the plunger spring 158 toward the first end 132A of the driver 132. Depending on its axial position, the post 144 is either spaced from the carrier pin 148 or has axial interference or overlap therewith. The carrier pin 148 is coupled to the carrier 146 and is biased toward the post 144 by a carrier pin spring 162. The carrier pin 148 is positioned closer to the steering column and the steering column aperture 122 than the axis A of the key cylinder 108 and the driver 132, and is positioned on the same side of the axis A as the lockbolt 120. When the key cylinder 108 is in the OFF position, the post 144 is also positioned closer to the steering column and the steering column aperture 122 than the axis A of the key cylinder 108 and the driver 132, and positioned on the same side of the axis A as the lockbolt 120 and the carrier pin 148. Likewise, the engagement between the post 144 and the carrier pin 148 occurs at a position between the axis A of the key cylinder 108 and the driver 132 and the axis B of the steering column. By using the space between the driver 132 and the steering column (i.e., between the driver 132 and the cover 124), the device can be more compactly packaged without sacrifice in function.

A portion of the driver 132 extends through the carrier 146 so that a cam 166 of the driver 132 is axially aligned with a cam follower surface 168 of the carrier 146. Rotation of the driver 132 by the key 104 and the key cylinder 108 thus causes movement of the carrier 146 (and the lockbolt 120 coupled thereto) in a direction substantially perpendicular to the axis A so that the lockbolt 120 can be moved between the locking and unlocking positions. In the illustrated construction, the carrier 146 and the lockbolt 120 are biased toward the locking position by a spring 172.

As shown in FIG. 2, the ignition lock steering column lock assembly 100 can also include a solenoid assembly 180, movable between locking and unlocking states, to selectively prevent rotation of the driver 132 from a first orientation to a second orientation. For example, the solenoid assembly 180 can be configured to prevent removal of the key 104 from the key cylinder 108 when an automatic transmission of the vehicle is not in a "PARK" position. This is accomplished by preventing rotation of the driver 132 to the orientation corresponding to the "OFF" position of the ignition switch and key cylinder 108, which is the only orientation where the key 104 is removable. The solenoid assembly 180 includes a bobbin 182 wrapped in coiled wire 184, and a core 186 extending through the bobbin 182. An armature 188 is movable, for example to pivot, toward the core 186 when electric current is conducted through the coiled wire 184. The armature 188 is biased away from the core 186 by a spring 190 or other biasing member. The armature 188 is configured to contact an abutment 192 of the driver 132 (FIGS. 14-16, 18, and 19) to selectively prevent rotation of the driver 132. The armature 188 generally defines a plane P and an axis of extension C within the plane P, and is configured to receive a force from the abutment 192 of the driver 132 in a direction substantially parallel to the plane P and the axis C. In other words, the armature 188 is provided with an axial end surface 188A which provides the selective interference or contact with the abutment 192.

Figure 3:
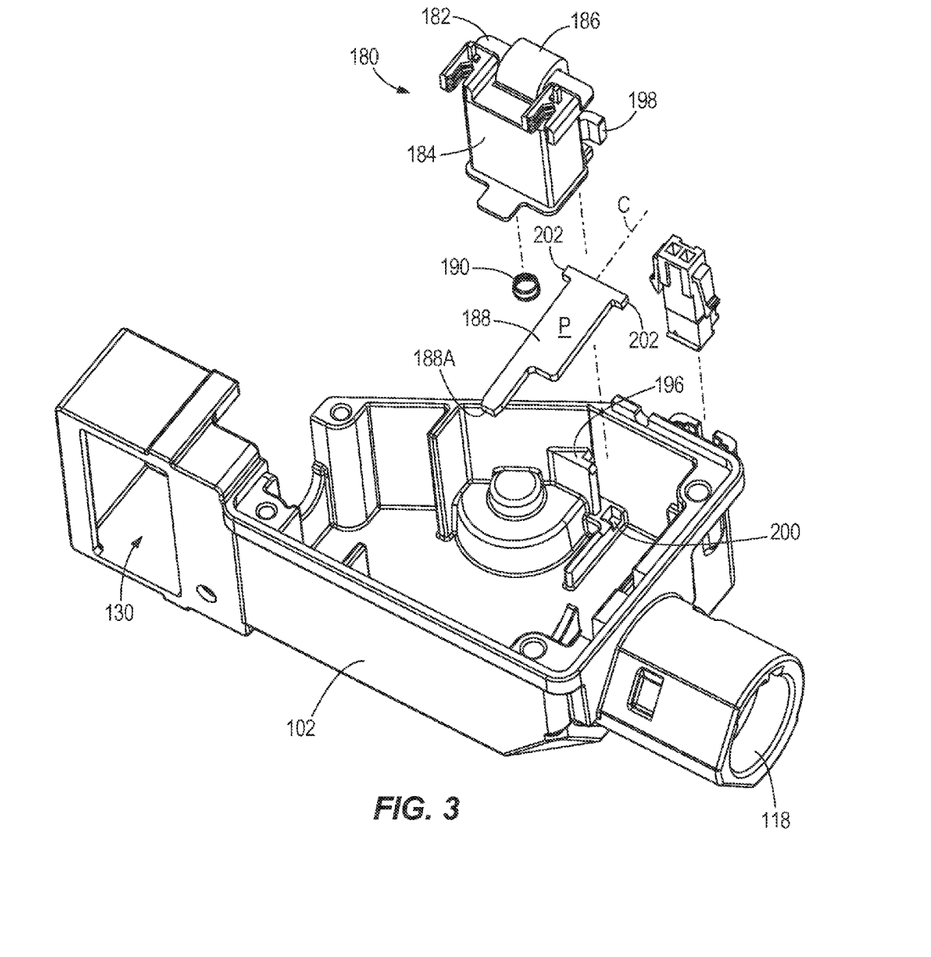
FIG. 3 is a partially exploded assembly view of a solenoid and a housing of the ignition lock steering column lock assembly of FIGS. 1 and 2.
Figure 4:
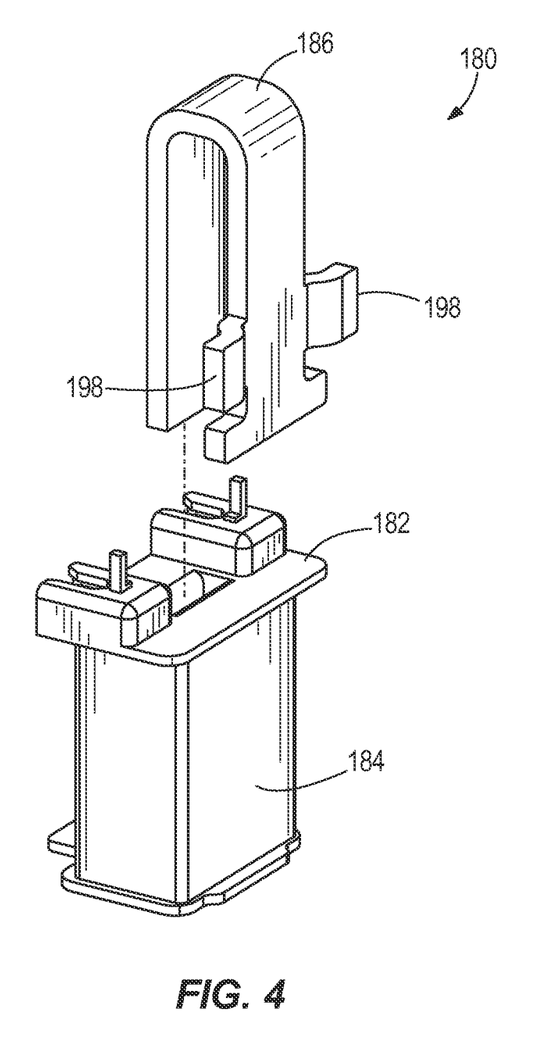
FIG. 4 is a partially exploded assembly view of the solenoid of FIG. 3.

It should be noted that the solenoid assembly 180 is not provided with any casing or housing of its own, and the armature 188 is not physically connected to the bobbin 182 or any other portion of the solenoid assembly 180 for guiding or supporting its movement. Rather, the components making up the solenoid assembly 180 are positioned and held in place directly by the housing 102 of the ignition lock steering column lock assembly 100 alone. For example, as shown in FIG. 3, the housing 102 includes a pair of guides 196 (one shown) that are configured to slidably receive and retain wings or projections 198 from the core 186. The housing 102 also includes a pair of opposed pockets or recesses 200 that receive corresponding projections 202 provided on the armature 188 to partially restrain movement of the armature 188 relative to the housing 102 and define a pivot axis for the armature 188 to move between the locking (activated) and unlocking (non-activated) positions. The illustrated construction not only alleviates the need for an external solenoid, requiring a coupling to the housing 102, but furthermore, simplifies the construction of the solenoid itself, which needs no dedicated housing as implemented.

Figure 5:
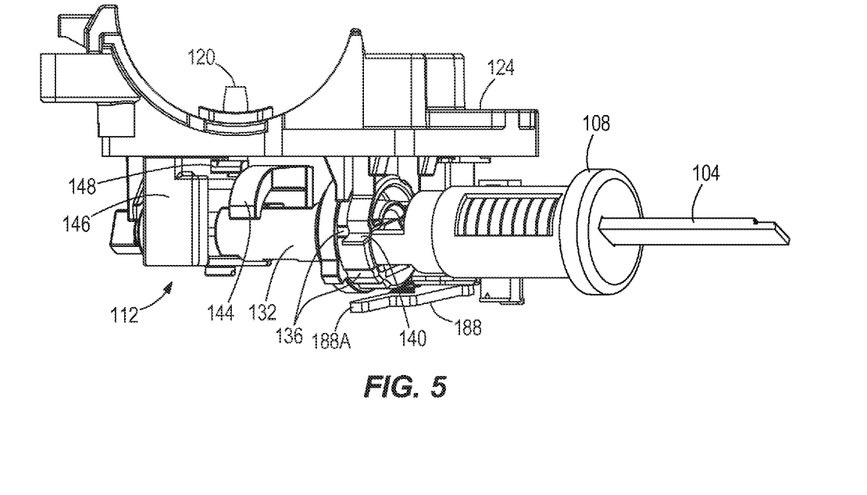
FIG. 5 is a perspective view of the ignition lock steering column lock assembly in a first operative state, OFF, with a key being inserted into a key cylinder.
Figure 6:
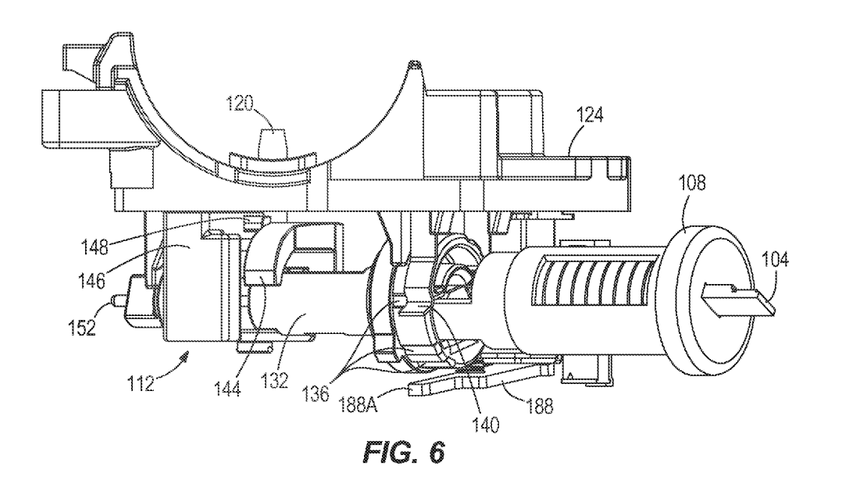
FIG. 6 is a perspective view of the ignition lock steering column lock assembly in a second operative state, OFF, with the key fully received into the key cylinder to actuate a carrier pin.
Figure 12:
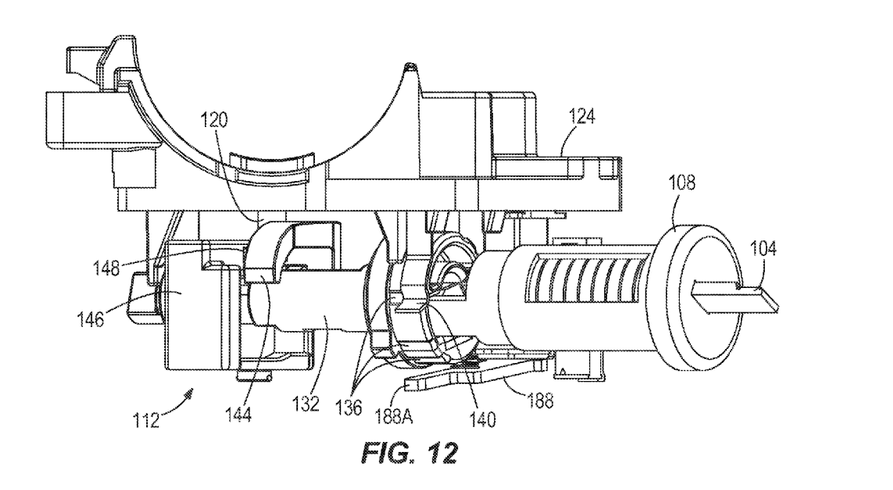
FIG. 12 is a perspective view of the ignition lock steering column lock assembly in a sixth operative state, with the key cylinder returned to the position of FIGS. 5 and 6 and the key being removed.
Figure 13:
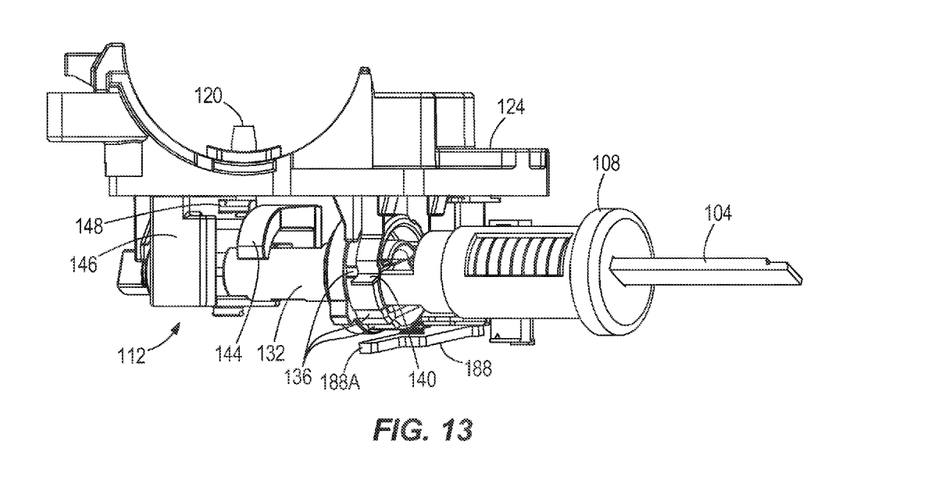
FIG. 13 is a perspective view of the ignition lock steering column lock assembly in a seventh operative state, with the key fully removed from the key cylinder and the steering column lock returned to the locked position.
Figure 14:
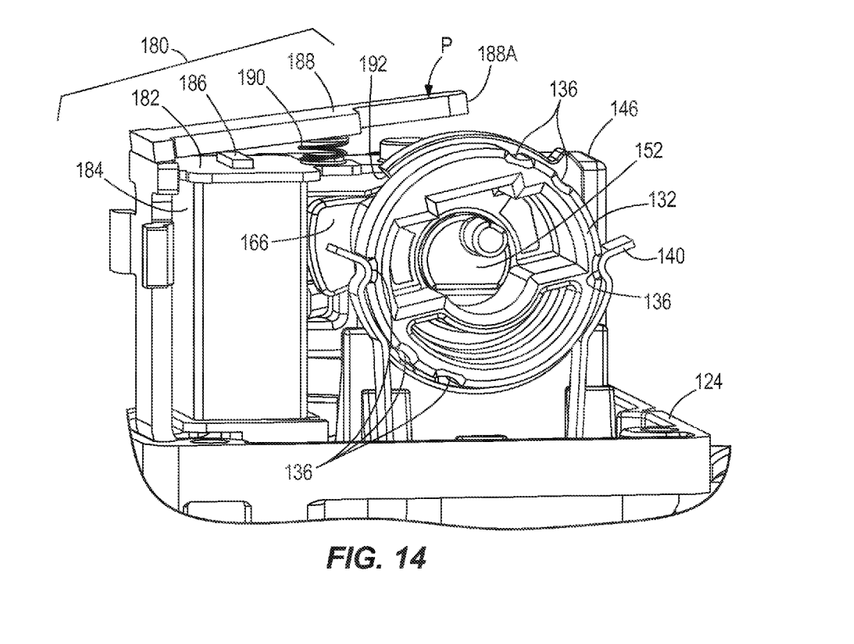
FIG. 14 is a perspective view of the ignition lock steering column lock assembly with the key cylinder removed. The ignition lock steering column lock assembly is shown in a position corresponding to FIG. 5.
Figure 19:
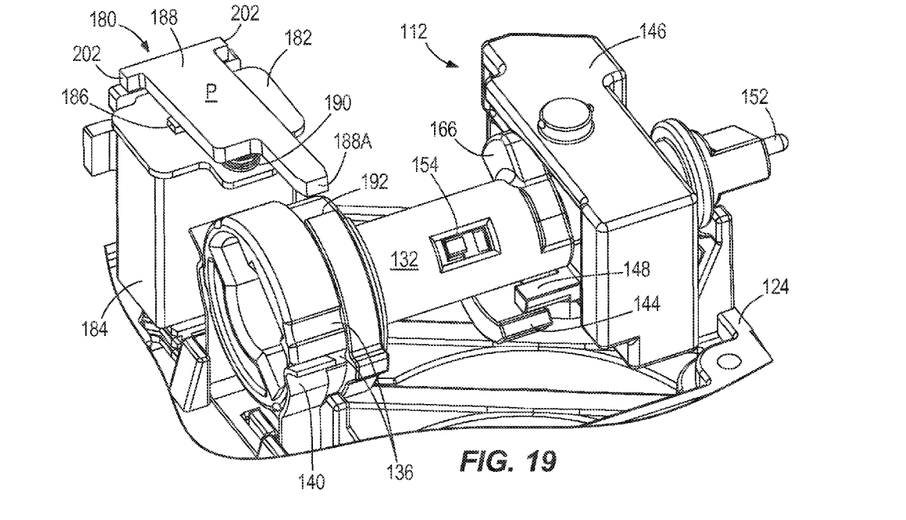
FIG. 19 is a perspective view of the ignition lock steering column lock assembly from an alternate angle, with the key cylinder returned to the position of FIG. 8 or 11.
Figure 20:
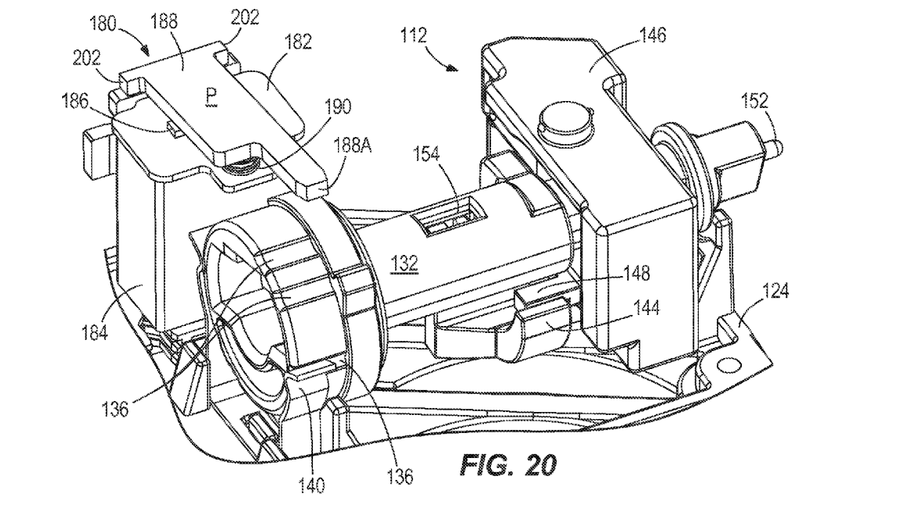
FIG. 20 is a perspective view of the ignition lock steering column lock assembly from an alternate angle, with the key cylinder returned to the position of FIGS. 5 and 6.
Figure 21:
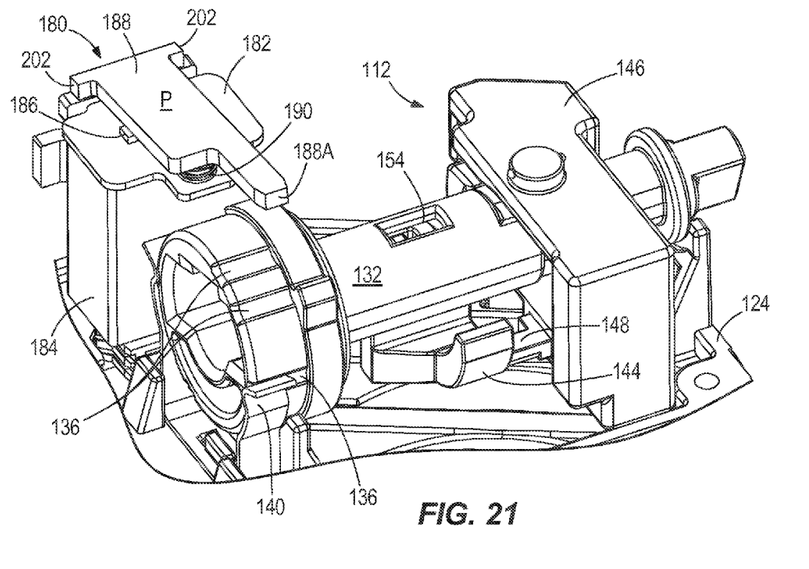
FIG. 21 is a perspective view of the ignition lock steering column lock assembly from an alternate angle, with the key removed from the key cylinder and the steering column lock moved to the locked position as in FIG. 13.

Operation of the ignition lock steering column lock assembly 100 is described with reference to a first sequence of drawings in FIGS. 5-13, a second sequence of drawings in FIGS. 14-18, and a third sequence of drawings in FIGS. 19-21. With reference to FIGS. 5 and 6, the key 104 is inserted into the key cylinder 108. The key cylinder 108 is in the OFF position and is held there by engagement between the resilient member 140 and at least a first notch 136 in the driver 132. An alternate view of this state is shown in FIG. 14. The lockbolt 120 is in the locked position, extending through the cover 124, from a previous locking event. When the key 104 is inserted, the plunger 152 is moved axially, and this in turn moves the post 144 axially into a first configuration to depress the carrier pin 148 against the carrier pin spring 162, since an axial interference exists in which both the post 144 and the carrier pin 148 are inclined to occupy the same axial position. The key cylinder 108 and the driver 132 do not move axially. In the position of FIG. 6, an axial end surface of a substantially arcuate actuating portion of the post 144 establishes the contact with the carrier pin 148.

Figure 7:
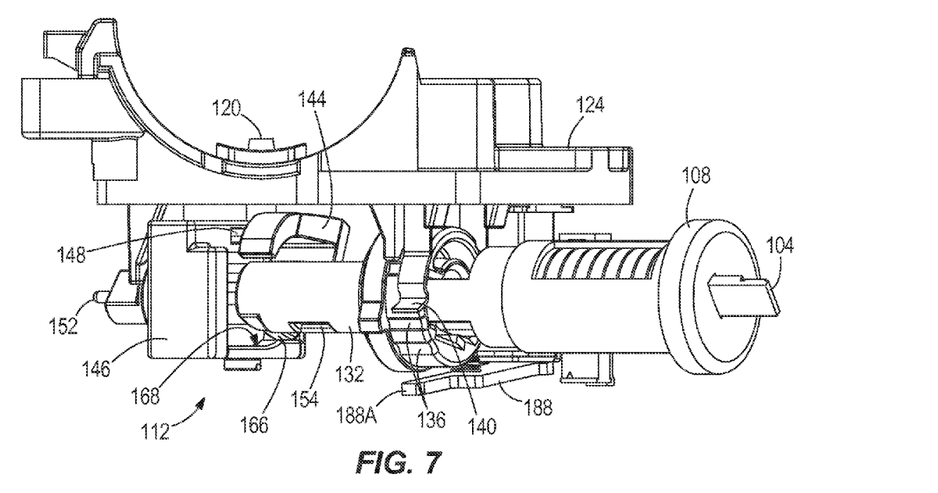
FIG. 7 is a perspective view of the ignition lock steering column lock assembly with the key cylinder rotated toward a third operative state, ACC, with the lockbolt being retracted from the steering column (not shown).
Figure 8:
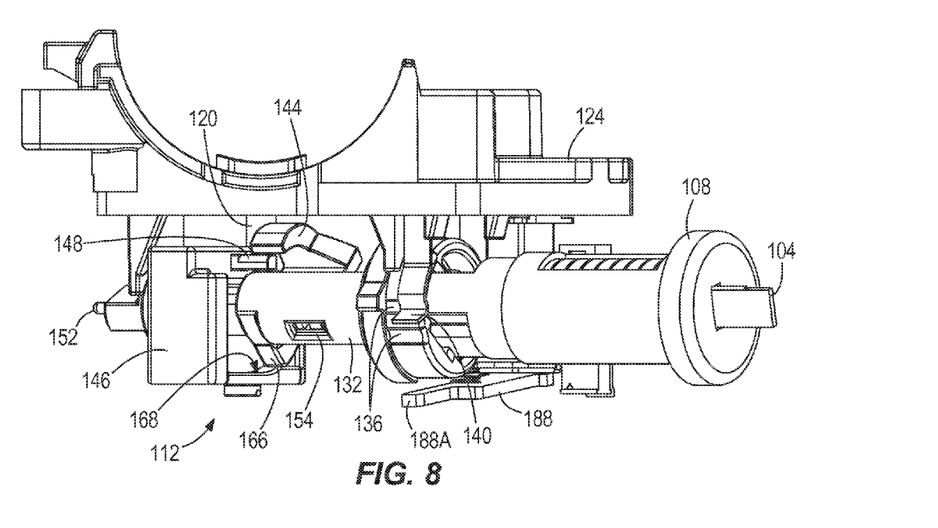
FIG. 8 is a perspective view of the ignition lock steering column lock assembly in a third operative state, ACC, with the lockbolt retracted to an unlocked position.
Figure 9:
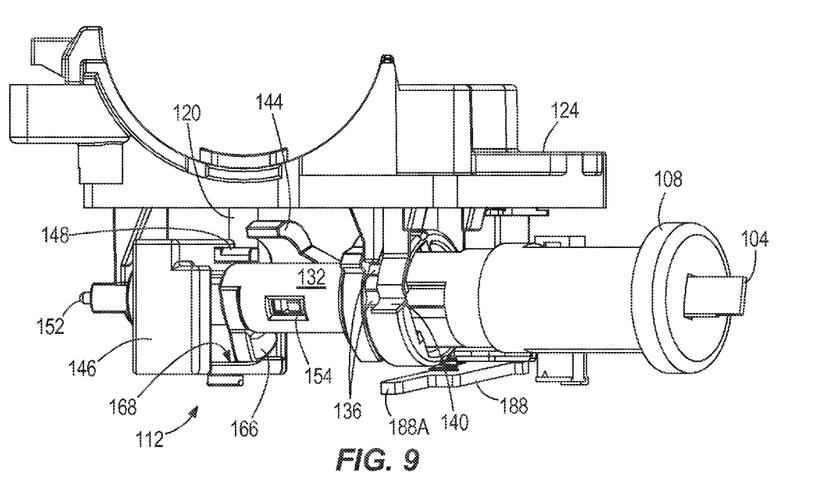
FIG. 9 is a perspective view of the ignition lock steering column lock assembly in a fourth operative state, RUN.
Figure 10:
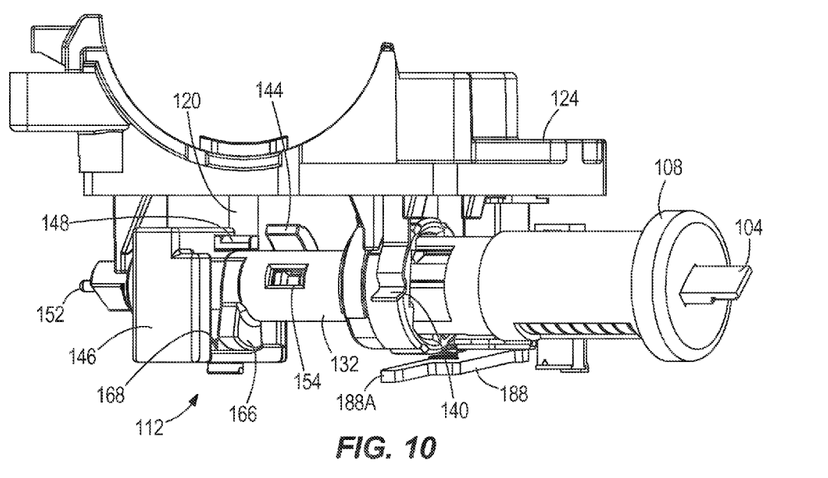
FIG. 10 is a perspective view of the ignition lock steering column lock assembly in a fifth operative state, START.
Figure 15:
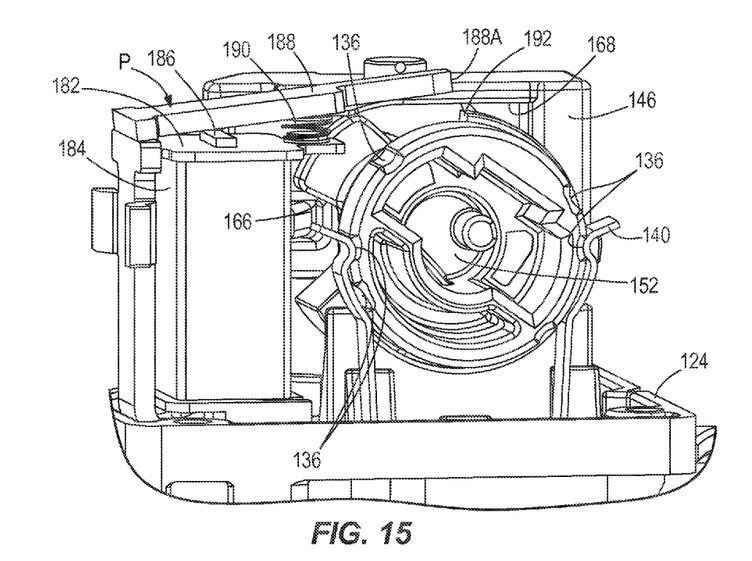
FIG. 15 is a perspective view of the ignition lock steering column lock assembly with the key cylinder removed. The ignition lock steering column lock assembly is shown in a position corresponding to FIG. 8.
Figure 16:
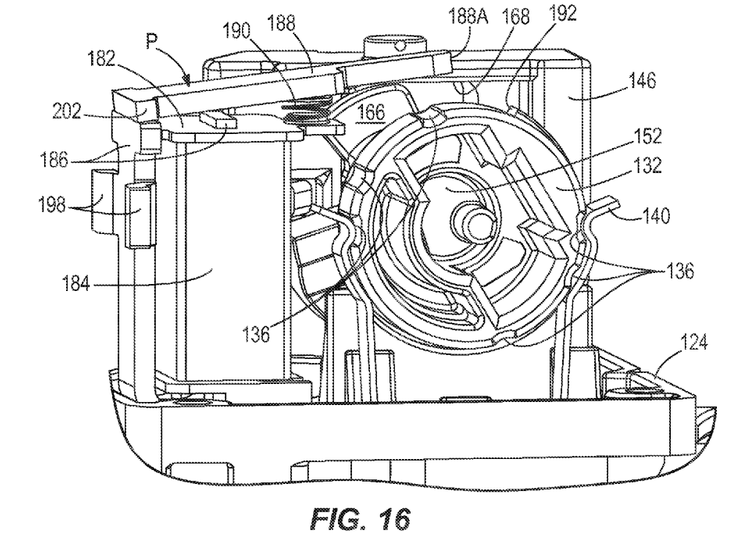
FIG. 16 is a perspective view of the ignition lock steering column lock assembly with the key cylinder removed. The ignition lock steering column lock assembly is shown in a position corresponding to FIG. 9.
Figure 17:
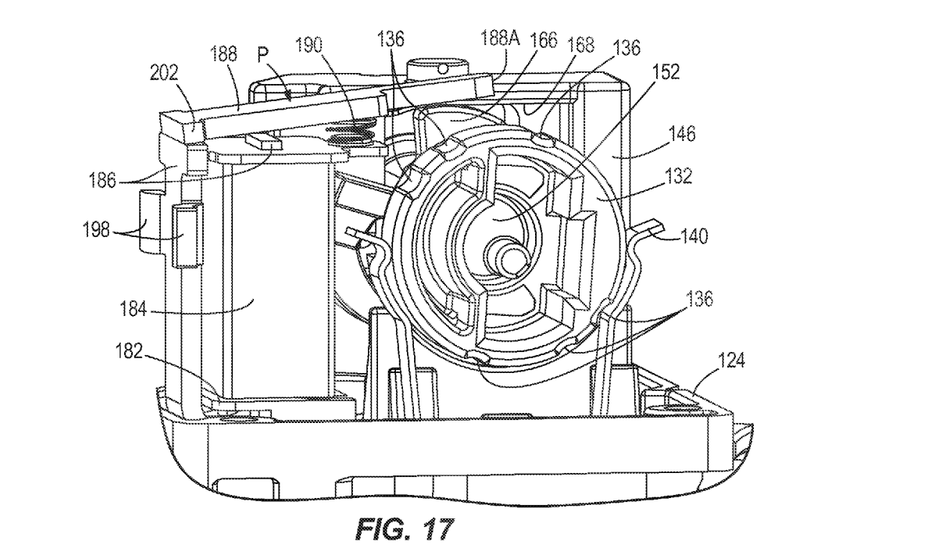
FIG. 17 is a perspective view of the ignition lock steering column lock assembly with the key cylinder removed. The ignition lock steering column lock assembly is shown in a position corresponding to FIG. 10.

FIGS. 7 and 8 illustrate rotation of the key cylinder 108 by the key 104 toward the ACC position. FIG. 8 shows the key cylinder 108 and the driver 132 reaching the ACC position, as the resilient member 140 engages at least a second notch 136 in the driver 132. An alternate view is shown in FIG. 15. As the ignition lock steering column lock assembly 100 is moved from the condition of FIG. 6, through the condition of FIG. 7, to the condition of FIG. 8, the lockbolt 120 is gradually moved or retracted to the unlocking position by engagement between the cam 166 and the follower surface 168 of the carrier 146. At the same time, the post 144 is rotated in unison with the driver 132 and the key cylinder 108, while the carrier 146 and the carrier pin 148 simply move linearly, away from the steering column axis B. Upon reaching the position of FIG. 8 (the ACC position), the contact between the axial end surface of the post 144 and the carrier pin 148 is broken, and the carrier pin 148 springs back to its original extended position. The carrier pin 148 is then positioned generally to the inside of the arc formed by the actuating portion of the post 144. Thus, there is no longer axial interference between the post 144 and the carrier pin 148, but rather there is axial overlap between the positions of the post 144 and the carrier 148 in this second configuration of the post 144. Further rotation of the key cylinder 108 results in reaching the RUN position (FIGS. 9 and 16), and even further rotation in the same direction (FIGS. 10 and 17) may engage a starting operation for the vehicle's drive source (e.g., energizing a starter motor of an internal combustion engine). Upon release of the key 104 from this operation, the key cylinder 108 and the driver 132 return via spring bias (e.g., from the ignition switch) to the RUN position as shown in FIGS. 11 and 18.

Figure 11:
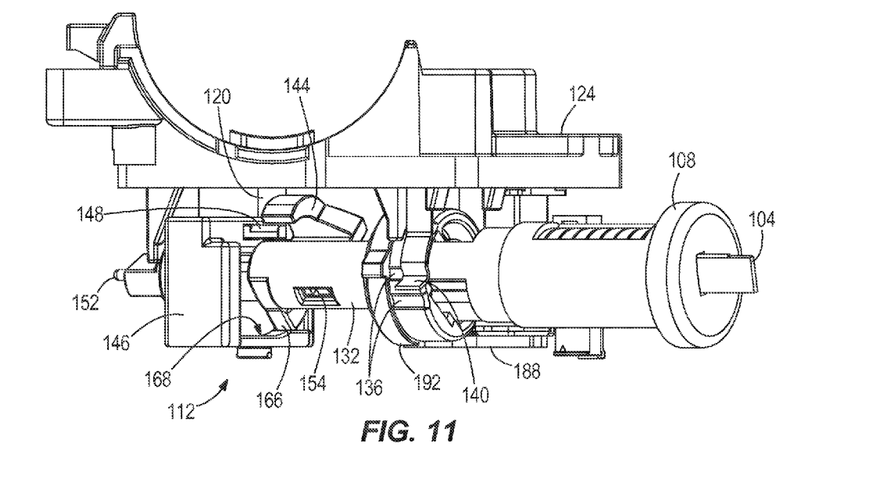
FIG. 11 is a perspective view of the ignition lock steering column lock assembly returned to the third operative state, ACC, with an armature of the solenoid moved to an actuated or locked position, preventing further rotation of the key cylinder to the position of FIGS. 5 and 6 to prevent removal of the key.
Figure 18:
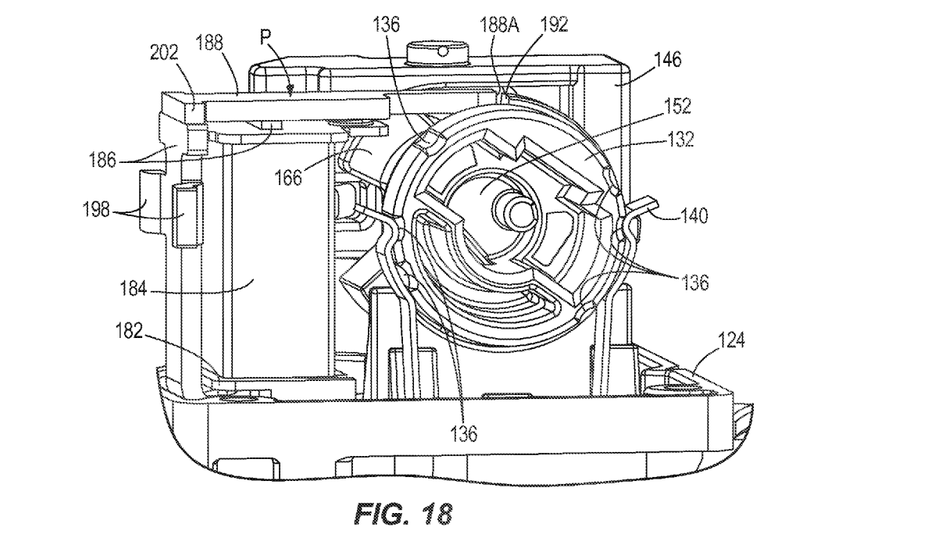
FIG. 18 is a perspective view of the ignition lock steering column lock assembly with the key cylinder removed. The ignition lock steering column lock assembly is shown in a position corresponding to FIG. 11.

As shown in FIGS. 11 and 18, the solenoid assembly 180 can be activated at this time, so that the armature 188 interferes with the abutment 192 of the driver 132 to prevent the key 104 from moving the key cylinder 108 to the OFF position, which prevents removal of the key 104, while the vehicle transmission is in a state other than PARK. Once PARK is achieved by the transmission, the solenoid assembly 180 is deactivated to allow the armature 188 to return to the non-interfering position, the key cylinder 108 can be rotated back to the OFF position (FIG. 11 to FIG. 12 and FIG. 19 to FIG. 20), and the key 104 can begin to be removed as shown in FIG. 12. Upon rotating from the ACC position toward the OFF position, the cam 166 of the driver 132 no longer prevents the carrier 146 and the lockbolt 120 from returning by bias force of the spring 172 toward the locking position. Instead, the post 144 is responsible for restraining the lockbolt 120 from moving to the locking position, by restraining the carrier pin 148 with the surface on the inside of the arc of the actuating portion of the post 144 due to the axial overlap. As soon as the key 104 is removed from the key cylinder 108, the plunger 152 and the post 144 are biased back toward the second end 132B of the driver 132, and the post 144 moves axially away from the carrier pin 148 to define a third configuration of the post 144, in which the post 144 can no longer restrain the carrier pin 148. As such, the carrier 146 and the lockbolt 120 are biased back to the locking position as shown in FIGS. 13 and 21.

What is claimed is:

1. A lock device for a vehicle having a steering member for controlling the direction of travel of the vehicle, the lock device comprising:
   a steering member receiving aperture configured to receive the steering member and position the lock device in relation to the steering member;
   a locking unit including a lockbolt selectively extendable from the lock device for engagement with the steering member to prevent its rotation;
   a driver operable to rotate about an axis in response to rotation of a key cylinder; and
   a solenoid assembly operable to selectively prevent rotation of the driver, the solenoid assembly including a bobbin, coiled wire surrounding the bobbin, a core extending through the bobbin, and an armature movable toward the core when electric current is conducted through the coiled wire,
   wherein the armature has a shape generally defining a plane and includes an axial end face configured to selectively interfere with an abutment of the driver such that force on the armature from the abutment in response to attempted rotation of the driver is directed generally along the plane.

2. The lock device of claim 1, wherein the driver is formed with detents engageable with a resilient member to positively define three separate operational positions of the lock device, the lock device further comprising an ignition switch operable by the driver between an off position, an accessory position, and a run position, wherein the ignition switch is held in each of the off, accessory, and run positions solely by the interface between the resilient member and the respective detents formed on the driver and engageable with.

3. The lock device of claim 2, wherein the detents of the driver are formed at an outer peripheral portion of the driver at an end of the driver that is remote from an ignition switch engaging end of the driver.

4. The lock device of claim 1, further comprising
   a housing at least partially receiving the driver and the locking unit, and
   a cover secured to the housing to define the steering member receiving aperture and a steering axis, the lockbolt being extendable through the cover for selectively engaging the steering member.

5. The lock device of claim 4, wherein the solenoid assembly is positioned within the housing, and wherein each of the bobbin, the coiled wire, the core, and the armature are held directly by the housing in a common interior space with the driver, without a separate solenoid casing or housing.

6. The lock device of claim 5, wherein the housing includes a pair of guides slidably receiving and retaining corresponding projections of the core.

7. The lock device of claim 6, wherein the housing includes a pair of recesses receiving corresponding projections of the armature to define a pivot axis of the armature.

8. The lock device of claim 4, further comprising
a carrier movable with the lockbolt,
a carrier pin supported by the carrier and movable from an extended position to a retracted position against a biasing member, and
a post coupled to the driver for rotation therewith, the post being axially slidable relative to the driver, the post having a first configuration which axially interferes with the carrier pin when the lockbolt is extended for engagement with the steering member, the post in the first configuration holding the carrier pin in the retracted position against a force of the biasing member without obstructing movement of the carrier and the lockbolt relative to the steering member, the post having a second configuration axially overlapping the extended carrier pin such that the post thereby obstructs the lockbolt from extending for engagement with the steering member, and the post having a third configuration which is axially spaced from the extended carrier pin so as to avoid axial interference and axial overlap with the carrier pin,
wherein the carrier pin is positioned between the driver and the cover.

9. The lock device of claim 1, further comprising
a carrier movable with the lockbolt,
a carrier pin supported by the carrier and movable from an extended position to a retracted position against a biasing member, and
a post coupled to the driver for rotation therewith, the post being axially slidable relative to the driver, the post having a first configuration which axially interferes with the carrier pin when the lockbolt is extended for engagement with the steering member, the post in the first configuration holding the carrier pin in the retracted position against a force of the biasing member without obstructing movement of the carrier and the lockbolt relative to the steering member, the post having a second configuration axially overlapping the extended carrier pin such that the post thereby obstructs the lockbolt from extending for engagement with the steering member, and the post having a third configuration which is axially spaced from the extended carrier pin so as to avoid axial interference and axial overlap with the carrier pin,
wherein the carrier pin is positioned on a side of the driver that is proximate the steering member receiving aperture.

10. The lock device of claim 1, further comprising a key receivable by the key cylinder, wherein the armature interferes with rotation of the driver to maintain the driver in a position which prevents removal of the key from the key cylinder, the solenoid assembly being configured to move the armature in response to a transmission of the vehicle being put into a park state.

11. The lock device of claim 8, further comprising a key receivable by the key cylinder, wherein the post is axially slidable relative to the driver in response to movement of the key within the key cylinder.

12. The lock device of claim 9, further comprising a key receivable by the key cylinder, wherein the post is axially slidable relative to the driver in response to movement of the key within the key cylinder.

* * * * *